(12) United States Patent
Abe et al.

(10) Patent No.: US 7,682,420 B2
(45) Date of Patent: Mar. 23, 2010

(54) METHOD FOR LEACHING GOLD

(75) Inventors: Yoshifumi Abe, Ibaraki (JP); Hiroshi Hosaka, Ibaraki (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 16 days.

(21) Appl. No.: 11/896,747

(22) Filed: Sep. 5, 2007

(65) Prior Publication Data

US 2008/0078269 A1 Apr. 3, 2008

(30) Foreign Application Priority Data

Sep. 28, 2006 (JP) ............................. 2006-264423

(51) Int. Cl.
*C22B 11/06* (2006.01)
(52) U.S. Cl. .............................. 75/743; 75/710; 75/711; 75/736; 75/744; 423/27; 423/38
(58) Field of Classification Search .................. 75/744, 75/736; 423/27, 38; *C22B 11/04*
See application file for complete search history.

(56) References Cited

U.S. PATENT DOCUMENTS

| | | | | |
|---|---|---|---|---|
| 3,647,414 A | * | 3/1972 | Nilsen | ........................ 423/83 |
| 4,097,271 A | | 6/1978 | Swinkels et al. | |
| 4,551,213 A | * | 11/1985 | Wilson | ........................ 75/736 |
| 5,292,490 A | | 3/1994 | Duyvesteyn et al. | |
| 5,304,359 A | | 4/1994 | Duyvesteyn et al. | |
| 6,746,512 B1 | * | 6/2004 | Shaw | ........................ 75/743 |

FOREIGN PATENT DOCUMENTS

| | | | |
|---|---|---|---|
| AU | 40114/93 A | | 6/1993 |
| EP | 0646185 B1 | * | 6/1993 |
| WO | WO-89/12699 A1 | | 12/1989 |
| WO | WO-2006/087412 A1 | | 8/2006 |

* cited by examiner

*Primary Examiner*—Jerry Lorengo
*Assistant Examiner*—Jared Wood
(74) *Attorney, Agent, or Firm*—Birch, Stewart, Kolasch & Birch, LLP (57) ABSTRACT

In a method for leaching gold from copper sulfides, the sulfide ores are first subjected to leaching of copper, thereby producing a leaching residue having 7.9% or less of the copper content. This leaching residue is mixed with a leach liquor, which contains the chloride ion and ferric ion and has 1.9 or less of pH. Gold and copper can be effectively leached from the copper sulfide ores. Ordinarily used oxidizing reagents such as hydrogen peroxide or nitric acid are not used. The gold, copper and iron can, therefore, be leached in a single process and by using an identical leaching liquor. The rate of gold leaching reaction can be enhanced by the co-presence of either copper or bromide ion or both together with the chloride and iron ion.

15 Claims, 4 Drawing Sheets

METHOD FOR LEACHING GOLD

This Nonprovisional application claims priority under 35 U.S.C. §119(a) on Patent Application No(s). 2006-264423 filed in Japan on Sep. 28, 2006, the entire contents of which are hereby incorporated by reference.

BACKGROUND OF INVENTION

1. Field of Invention

The present invention relates to a method for leaching of gold for recovering the gold from sulfide ores and silicate ores containing gold. More particularly, the present invention relates to the leaching method of gold in an aqueous solution under atmospheric pressure and at a temperature lower than the boiling temperature.

2. Background Technique

Copper sulfide ores and silicate ores, which are accompanied with the copper sulfide ores, contain gold. Methods for recovering the gold from such ores are largely classified into two types. One of the methods involves heating to high temperature of 1000° C. or more. Specifically, the copper sulfide ores and the silicate ores containing gold are melted together with iron sulfide. Silicate ore may be added as a flux agent. As a result, $Cu_2S$ referred to as the matte and slag mainly composed of iron oxide and silicate and containing impurities are formed. The matte is reduced at high temperature to yield low-purity metallic copper, referred to as crude copper. The crude copper is subjected to the electrolytic decomposition to yield the metallic copper having purity of 99.99% or more. Gold contained in the raw material behaves in the same manner as the copper during the production of metallic copper. Gold and the other precious metals are recovered in the precipitates referred to as "electrolytic copper sludge" during the electrolytic decomposition process.

The electrolytic copper sludge is melted together with lead so as to concentrate the precious metals in the lead. The lead, in which the precious metals are concentrated, is oxidized to remove the lead. A silver plate containing these precious metals, such as gold, referred to as a prototype silver plate, is produced. The prototype silver plate is subjected to electrolytic decomposition to electrolytically deposit the refined silver and to yield the precipitates referred to as the electrolytic silver sludge, which contains the precious metals. These precipitates are treated by nitric acid or the like to dissolve the precious metals other than gold. The resultant solid gold is melted to produce a prototype gold plate, which is gold having low purity. The prototype gold plate is subjected to electrolytic decomposition to recover the high-purity gold. High temperature exceeding 1000° C. is necessary in this method. Since the main purpose of this method is to produce metallic copper, and gold is recovered as a byproduct, the treating process until the gold recovery is disadvantageously very long.

The other method of recovering gold is to bring the copper sulfide ore or the like into contact with a solution which contains a complex-forming compound, such as cyanide, thiourea, and thiosulfuric acid, which are liable to form a gold compound. These complex-forming compounds are caused to react with the gold and the reacted gold is then dissolved in the solution. The dissolved gold is adsorbed on the surface of activated carbon. High temperature is not necessary and the recovering process is short in this process. However, when such metallic elements as copper and iron are co-present with gold, these metallic elements form complex compound, which uses up the complex-forming agents. It is, therefore, advisable to preliminarily remove the metallic elements other than gold to an appropriate level. "REVIEW OF GOLD EXTRACTION FROM ORES", S. R. La BROOY, H. G. LINGE and G. S. Walker, Minerals Engineering, Vol. 7, No. 10, pp 1231-1241 proposes separate treatments of the gold and the metals other than the gold.

Gold and a halogen-group element form a complex compound, which is liable to dissolve in the aqueous solution. This property is utilized, for example, in U.S. Pat. No. 5,487,819, which proposes to leach gold in an aqueous solution containing a halogen-group element. An oxidizing reagent is necessary in this process to oxidize the metallic gold to the gold ions. Usually, nitric acid, hydrogen peroxide, or chlorine having the standard oxidation reduction potential of more than +900 mV are used as the oxidizing element. Since almost all of the metallic elements contained in the ore are oxidized under the presence of the oxidizing agent having the high oxidation-reduction potential mentioned above, more of oxidizing agent is consumed for oxidizing the metallic elements other than gold than that for recovering oxidizing gold (c.f., "Establishment of Wet Processing Technique for Copper Sludge", Akinori, TORAIWA, Yoshifumi, ABE, "Shigen to Sozai" Vol. 116 (2000), No. 6, pp 484-492.

DISCLOSURE OF INVENTION

When copper-sulfide ores containing gold, or the silicate ore, which contains gold and is accompanied with the sulfide ore, are leached so that the gold is dissolved in the solution, the copper and iron contained in the ores consume such reagents as cyanide, thiourea and thiosulfuric acid for leaching the gold. These reagents are expensive. In addition, since these reagents are consumed for dissolving the co-existing copper and iron contained in the ores in greater amounts than the gold, the cost for recovering gold becomes enormous. Furthermore, since the copper and iron are dissolved from the leaching residue, and the sulfur remains in the leaching residue, the surface of the raw materials are covered by the sulfur. The raw materials may, therefore, be passivated by the sulfur and the leaching reactions may be disturbed.

Proposals have been made to decrease the consumption of reagents for dissolving the gold. According to one proposal, the copper and iron contained in the ores are preliminarily dissolved in the solution, and subsequently the resultant ore having lower content of copper and iron is dissolved. Another proposal is to preliminarily roast the copper sulfide ore so as to remove the sulfur from the raw material.

Such pre-treatments make the process complicated and increase the recovering cost of gold. In addition, most of these processes are carried out in the solution of high acidity, and the products from those process bring some acid to make a solution pH very low when the product is mixed with the aqueous solution. However, since a leaching process of gold is carried out from pH range to high alkaline concentration, the thus preliminarily treated product must be neutralized prior to the gold dissolving process. The use of the neutralizing reagents increases, as does the use of recovering cost of gold.

Such reagents as cyanide, thiourea and thiosulfuric acid are expensive, easily decomposed and toxic. It is, therefore, necessary to very strictly handle them during and after dissolving the gold. This is also a factor which increases the cost of recovering gold. In addition reaction time of these reagents with gold is so long and amount of gold in process disadvantageously increases.

The gold leaching method with the use of halide such as chlorine and bromine or its gas attains higher reaction speed than that using cyanide. In the former method, halogen gas is used as the oxidizing agent. Chlorine gas and bromine gas achieve high oxidizing states, 1242 mV and 1070 mV (versus SHE), respectively. Although the leaching of gold is promoted, this method is disadvantageous in that it uses expensive halides and strongly corrosive halide gases, and it requires difficult handling. In addition, when the halide gases are ionized as a result of the reactions, the resultant halide ions exhibit high potential. Consequently, when the halide gases are added in excess, the surface of the raw material may be passivated and the subsequent reactions may not proceed. In the case of using iodine, the iodine reacts with iron which is one of gangue components contained in the raw material and more amount of the iodine is consumed than the necessary amount for leaching the gold.

The reagents such as cyanide, thiourea and thiosulfuric acid have extremely high oxidation-reduction potential so that they are not effectively oxidized by oxygen and are not reusable. More specifically, these reagents are reduced as a result of the leaching reactions, and the reaction products of these reagents cannot be oxidized by the oxygen contained in the air, because the oxygen has lower oxidation-reduction potential than these reagents. They cannot, therefore, be reused by a simple method.

SUMMARY OF INVENTION

It is, therefore, an object of the present invention to solve the problems described hereinabove and to provide a leaching method for effectively leaching at least copper and gold from the copper sulfide ores.

In accordance with the present invention the following methods are provided.

(1) A method for leaching gold from a copper sulfide ore containing gold and/or a silicate ore containing gold comprising: leaching copper down to 7.9% or less of copper content, bringing the leach residue of said copper sulfide ore containing gold and/or silicate ore containing gold into contact with solution that dissolves chloride ion and ferric ion, thereby oxidizing the gold with oxidizing potential of the ferric ion under less than 1.9 of pH.

(2) A method according to (1), wherein said leach residue is added into solution which contains chloride ion and ferric ion.

(3) A method according to (1), wherein said leach residue is added into solution, which dissolve chloride ion and iron ion, and the method further comprises blowing air into the solution thereby oxidizing said iron ion.

(4) A method for leaching gold from a copper sulfide ore containing gold and/or a silicate ore containing gold, comprising: leaching copper down less than 7.9% of copper content in solution that containing chloride ion and ferric ion; blowing air into the solution to oxidize iron to ferric ion under less than 1.9 of pH and oxidizing gold with the oxidation potential of ferric ion.

(5) A method according to (1) or (4), wherein copper ions are co-present in the leaching solution of gold so as to increase the leaching speed of gold.

(6) A method according to any one of (1) through (5), wherein bromide ion is co-present in the leaching solution of gold, so as to increase the leaching speed of gold.

(7) A method according to any one of (1) through (6), wherein the concentration of ferric ion in the leaching liquor of gold is 0.01 g/l or more.

(8) A method according to any one of (1) through (7), wherein the leaching liquor of gold is stirred, and air is blown into the leaching liquor, so as to oxidize the ferrous iron ion to ferric ion.

The present invention attains the following advantages (1) through (8).

(1) Gold and copper can be effectively leached from the copper sulfide ores containing gold by treatment in an aqueous solution containing chloride ion and iron ion. Ordinarily used oxidizing reagent such as hydrogen peroxide or nitric acid, or the complex-forming reagent such as cyanide, thiourea and thiosulfuric acid are not used.

(2) The chloride ion and iron ion are effective for leaching not only the gold but also copper and iron contained in the copper sulfide ores. The gold, copper and iron can be leached in a single process and in the same leach solution. A gold leaching process, therefore, becomes short and its equipment cost can be saved.

(3) The rate of gold leaching reaction can be enhanced by co-existing either copper ion or bromide ion or both together with the chloride and iron ions. The reaction time can, therefore, be shortened, and a reaction vessel can be small sized. As a result, its equipment cost can be saved.

(4) The iron and copper contained in the raw material can be leached and then can be used for leaching the gold. Reagent costs can, therefore, be saved.

(5) Among such reagents as chlorine and bromine, the bromine that is provided as a bromide in this method is expensive. The bromide may form coordinate compounds with such metallic elements as copper and iron, the concentration of which is considerably higher than that of gold in the solution. No matter how such coordination occurs, the bromine is hardly at all consumed, because the bromine is relieved from the copper or iron bromides and is then left in the solution in the form of bromide ion, when the dissolved metallic ions are recovered from the solution. For example, iron is precipitated in the form of hydroxide and is separated from the solution and copper is recovered by electrowinning or is substituted with a less noble metal. The bromide ion is relieved from the iron or copper bromides during these recovering process and is left in the solution.

(6) The gold leaching reaction is realized under the oxidation by ferric ion in the solution. The gold is dissolved as chloride or bromide in the solution. Copper ion promotes the oxidation of iron ion mentioned above. When the leaching reaction of gold occurs, the ferric ion and the cupric ion are reduced to be ferrous ion and cuprous ion, respectively. The resultant ferrous ion and cuprous ion can be oxidized by the proton contained in the solution or by blown air, and can be regenerated into the oxidizing reagent. The proton which oxidizes the ferrous ion and the cuprous ion can be fed by means of maintaining the pH of the solution at 1.9 or less.

Because the leaching reaction of gold is performed under the region of oxidizing copper chloride and iron chloride, +480 mV or more of the oxidation and reduction potential (versus Ag/AgCl electrode) of the solution is enough for the reaction and there is no need to make the potential as high as +778 mV or more (versus Ag/AgCl electrode, +1000 mV versus SHE) that is performed by using chlorine gas or bromine gas.

(7) Reagents are almost not at all consumed by the method of the present invention. The oxidizing reagent used in the present invention is neither corrosive nor toxic at all. Since the raw materials containing sulfur and gold together with copper and iron need not be pretreated, gold can be leached in a single process.

(8) The metallic ions are leached into the solution containing the chloride and bromide ions. After the leaching reactions, elementary sulfur remains in the residue. Although the elementary sulfur covers the surface of the residue in the sulfuric acid solution, the residue leached in the halide solution maintains porous surface and the surface allows the leach solution penetrating into the residue. Namely, the leaching reactions do not terminate due to the passivation of the leaching residue by the elementary sulfur (c.f., "The Effect of Chloride Ions On the Dissolution of Chalcopyrite in Acid Solution". Z. Y. Lu, et al, Hydrometallurgy, 56, 2000, pp 189).

DESCRIPTION OF PREFERRED EMBODIMENTS

In the present invention, the copper sulfide ore containing gold and/or the copper sulfide ore, in which the silicate ore containing gold is accompanied, are leached with any solution, preferably a halide solution (hereinafter referred to as the first leaching liquor). As a result of leaching, the copper content in the copper sulfide ore is decreased to 7.9% or less. The resultant post-leaching solution, in which the leaching residue is mixed, is further mixed with solution containing the chloride ion and the ferric ion are co-present (hereinafter referred to as the second leaching liquor). The second leaching liquor may be mixed with a solution, in which either or both of copper ion or bromide ion are co-present. The resultant leaching liquor is hereinafter referred to as the third leaching liquor.

Various methods of oxidation for leaching copper from the copper sulfide ores have been proposed, such as blowing oxygen into the sulfuric acid solution or blowing oxygen or chlorine gases into the chloride solution. Any one of these methods can be used to leach copper from copper sulfide ores in the present invention. A preferable method of leaching copper from the ores is the one in chloride media, because the pregnant solution of copper need not be subjected to the solid-liquid separation but can be readily subjected to leaching gold. Furthermore, the iron and copper ions dissolved from the ores into the halide-based pregnant solution can be readily used for leaching gold according to the methods (1) and (5), respectively.

An oxidation potential of a chemical reaction in chloride media is different from that of an aqueous system. Specifically, the standard oxidation potential of $Au^{3+}/Au$ (which indicates the oxidation-reduction system of $Au^{3+}+3e \rightarrow Au$, specifically with regard to the halide bath, $AuCl_4^-/Au$) is 1500 mV in the aqueous system and is as low as 1000 mV in chloride media (c.f. Dissolution Chemistry of Gold and Silver in Different Lixivants". J. Brent Hiskey and V. P. Atluri, Mineral Processing and Extractive Metallurgy Review, pp 95, Vol. 4, 1988). These facts indicate that the oxidizing reagent having lower oxidation potential has a possibility of leaching gold at lower oxidation potential than that in water. Moreover, in the case of gold bromide, the oxidation reduction potential of $AuBr_4^-/Au$ is reduced very low to 870 mV (c.f "Refractory Concentrate Cold Leaching; Cyanide vs. Bromide", A. Dadger, JOM, December, pp 37, 1989)

There is a possibility that an oxidizing reagent having a low oxidation potential can leach gold with forming gold chloride or gold bromide. However, since the standard oxidation reduction potential of gold chloride complex is 1000 mV, the standard oxidation reduction potential of conventionally used oxidizing reagent, such as hydrogen peroxide, chlorine gas, bromine gas, is higher than 1000 mV. The oxidation reduction potential of nitric acid is 960 mV.

The present inventors discovered that ferric ion works well as an oxidizing reagent in chloride media for leaching gold and gold can be dissolved at lower oxidation potential than that of former conventional methods. The inventors also discovered that the oxidation potential of gold can be further lowered by addition of bromide ion, and, as a result, the leaching rate of gold is enhanced.

The bromine concentration in the leach solution is to be high enough to form gold bromide and to form gold bromide complex and is to be dependent on the leached gold concentration. There is an upper limit of the bromine solubility in a sodium chloride solution because the solubility is dependent on the concentration of sodium chloride. A preferable concentration of bromide ion is from 1 to 80 g/l because of its solubility in sodium chloride solution. Desirable concentration of bromine taking into consideration of economic usage is from 10 to 26 g/l.

Chloride ion is added to form gold chloride and gold chloride complexes. Chloride ion is also added to stabilize cuprous ion, that is produced through the leaching reaction, to enhance the iron oxidation. The chloride concentration is usually suitable from 1 to 6.5 mol/l, and is preferably from 3.3 mol/l (118 g/l) to 5.2 mol/l (186 g/l). When the concentration of the chloride ion is higher than 5.2 mol/l, sodium chloride is precipitated and its concentration is limited by increasing concentration of metal dissolved through leaching ore.

Gold can be leached when the concentration of iron ion is 0.10 g/l or more. The reactivity is higher as the concentration of the iron increases. The leaching rate is the highest where the iron concentration is 0.26 g/l. Desirably, the iron concentration is, therefore, approximately 0.26 g/l. Iron contained in the ores is leached by the first leaching liquor into the solution and then behaves as an oxidizing reagent. It is, therefore, not necessary to preliminarily add the iron into the second leaching liquor.

The copper ion does not directly participate in the leaching reactions of gold but enhance the oxidation rate of gold by iron ion. Copper ion is, therefore, desirably added to the leach solution. The concentration of copper ion is not particularly limited but may be approximately from 5 to 20 g/l so as to enhance the oxidation rate mentioned above.

The sulfide ore is leached by any known method using the first leaching liquor to decrease the copper content to 7.9% or less. The resultant leaching residue is mixed with the second leaching liquor, which contains ferric ion and chloride ion. The gold contained in the leach residue can, thus, be leached. The fundamental characteristic of this reaction is that the oxidation reduction potential of the solution is determined by the activity ratio of the ferric ion to ferrous ion, i.e., $[a(Fe^{3+})]/[a(Fe^{2+})]$ and should be maintained higher than the formation potential of gold chloride complex or gold bromide complex. When the activity ratio of the ferric ion to ferrous ion, i.e., $[a(Fe^{3+})]/[a(Fe^{2+})]$, lowers as the reaction progresses, oxygen is blown into the solution to promote Reaction 1, given below, and hence increase the concentration of the ferric ion. The oxidation reduction potential of the solution can, therefore, be maintained at high level.

$$Fe^{2+}+H^++(¼)O_2 \rightarrow Fe^{3+}+(½)H_2O \qquad \text{Reaction 1}$$

Oxygen in air is available as an oxidant. The proton can be fed by means of adding hydrochloric acid. As the oxidation reaction proceeds, the proton is consumed and pH of the solution increases. Then, the hydrochloric acid is added to keep pH constant. Reaction 1 can thus proceed further. The pH 1.9 or less is suitable for the reaction. However, when pH is very low, the oxidation rate of ferrous oxidation should be slow. Desirably pH is from 0.5 to 1.9

Iron and copper contained in the raw material can be leached and are dissolved in the solution with ferric chloride and cupric chloride. When the dissolution of these elements is almost completed, the leaching of gold starts.

Chloride ion and bromide ion form gold complexes and lower the oxidation potential of gold. Since these gold complexes are neither precipitated nor gasified, these ions remain in the solution and hence are not lost due to the leaching reactions. In addition, since neither chlorine gas nor bromine gas are used, these components do not disappear into the air. When chloride ion and bromide ion form a coordinate compound with copper or iron, the copper coordinate compound releases those halide ions by reduction, and the iron coordinate compound also releases those halide ions by hydration and precipitation. These halide ions are therefore not lost due to formation of any coordinate compound.

The bromide ion is added for instance in the form of such as sodium bromide. Higher concentration of the bromide ion is more desirable. The solubility of the bromide ion is influenced by the concentration of chloride ion which is added together. Practically, the suitable concentration of bromide ion is from 1 to 50 g/l, preferably from 10 to 25 g/l.

Before reaction, chloride ion is added in a leach solution as sodium chloride to make oxidants such as iron and copper stable. Especially, it is needed to stabilize cuprous ion that is produced by gold oxidation. The total concentration of the chloride ion including those of iron and copper chlorides is from 1 to 6.5 mol/l, preferably from 3 to 6 mol/l. The solubility of sodium chloride is influenced by the concentrations of the copper and iron chlorides. Therefore, when these concentrations are too high, and/or when the copper and iron are dissolved as a result of the leaching reactions, the total concentration of chloride ion increases so much to precipitate sodium chloride crystal.

The suitable concentration of the iron which is present in the second leaching liquor as the oxidizing reagent for leaching gold is from approximately 0.01 to 0.26 g/l. When iron concentration is higher than this range, the gold leaching reaction is not affected and not disturbed. Iron need not be preliminarily added to the second leaching liquor, provided that ore contains iron and iron is dissolved from the ore.

Copper ion behaves as the oxidizing reagent and also works as catalyst for oxidizing ferrous ion in the third leaching liquor during the leaching. The copper ion is recovered as metallic copper after the leaching. Oxidation rate of ferrous ion to ferric ion is inherently extremely slow. The oxidation rate is, however, enhanced under the co-presence of copper ion. The copper ion in the third leaching liquor is in forms of copper chlorides. Iron and copper sulfides as well as gold can be effectively leached by the third leaching liquor. The leaching reactions of the copper sulfide by cupric chloride are expressed by Reaction 2 through 4, below. As a result of the reaction, cupric chloride is reduced to cuprous chloride.

$CuS + CuCl_2 \rightarrow 2CuCl + S$                           Reaction 2

$Cu_2S + 2CuCl_2 \rightarrow 4CuCl + S$                       Reaction 3

$CuFeS_2 + 3CuCl_2 \rightarrow 4CuCl + FeCl_2 + 2S$           Reaction 4

Stabilizing the produced cuprous ion can proceed these reactions. The concentration of chloride ion described hereinabove is, therefore, important for stable dissolution of the cuprous chloride.

The raw material is added to the second or third leaching liquor, the composition of which has been adjusted as described hereinabove. The leaching liquor is heated to temperature of 80° C. or more and is agitated with blowing air. During the leaching reaction, the hydrochloric acid is added to the leaching liquor to adjust pH 1.9 or less, preferably in a range of from 0.5 to 1.9. The oxidation rate of iron can be enhanced by this pH adjustment. The iron dissolved in the solution can be its hydroxide and is precipitated depending upon pH. As a result of the precipitation, protons are released as shown in Reaction 5 and 6, below. Note that the protons are expressed as HCl. The protons are effectively used for the oxidation of cuprous ion or ferrous ion.

$FeCl_3 + 3H_2O \rightarrow Fe(OH)_3 + 3HCl$                   Reaction 5

$FeCl_3 + 2H_2O \rightarrow FeOOH + 3HCl$                      Reaction 6

The ferric ion used as the oxidizing reagent of gold and the copper ion used for promoting the iron oxidation are involved in the respective oxidation reaction in which the ferric ion and the cupric ion are reduced to the ferrous ion and the cuprous ion, respectively. Reaction 1 and 7 are the oxidation reactions of the ferrous ion and the cuprous ion, respectively. The resultant ferric ion and cupric ion can be continuously used for the leaching reaction.

$Cu^+ + H^+ + (\frac{1}{4})O_2 \rightarrow Cu^{2+} + (\frac{1}{2})H_2O$          Reaction 7

The oxygen is consumed in Reaction 7. The consumed oxygen can be supplied by the oxygen of air as is well known.

EXAMPLES

Example 1

The liquor (the third leaching liquor), which contains 25 g/l of copper as cupric chloride, 2 g/l of iron as ferric chloride, 180 g/l of chloride ion including those of copper chloride and iron chloride, and 22 g/l of sodium bromide, are prepared for leaching. Feed was a copper concentrate that consisted of 15% of chalcopyrite ($CuFeS_2$), 35% of chalcocyte ($Cu_2S$), 18% of the ore, and 32% of pyrite($FeS_2$) and that a component of 31.7% of copper, 17.5% of iron, 22.1% of sulfur and 66 g/t of gold. 15% of the total gold was present in the pyrite, while the remaining 85% was distributed among the other ores.

1260 g of the copper concentrate was added to 9 liter of the leaching liquor, which was heated to 85° C. and stirred. While the stirring was further continued, samples of solution and leach residue were taken from the solution. The concentration of gold, which was leached into the solution, and the content of copper, which was not leached and remained in the residue, were analyzed. The results are shown in Table 1.

TABLE 1

Measuring Results of Example 1

| Reaction Time (hrs) | Temperature (° C.) | ORP (mV) | pH | Copper Content in Residue (%) | Gold Concentration in Solution (mg/l) |
|---|---|---|---|---|---|
| 3 | 85 | 423 | 1.5 | 19 | 0 |
| 3 | 85 | 413 | 1.5 | 7.9 | 0.01 |
| 3.4 | 85 | 451 | 2.0 | 6.2 | 0.02 |
| 3.4 | 85 | 459 | 1.7 | 2.8 | 0.02 |
| 5 | 85 | 514 | 2.0 | 1.2 | 0.15 |
| 6 | 85 | 459 | 1.5 | 0.63 | 0.24 |

TABLE 1-continued

Measuring Results of Example 1

| Reaction Time (hrs) | Temperature (° C.) | ORP (mV) | pH | Copper Content in Residue (%) | Gold Concentration in Solution (mg/l) |
|---|---|---|---|---|---|
| 12 | 85 | 528 | 1.5 | 0.50 | 0.33 |
| 16 | 85 | 533 | 1.5 | 0.35 | 0.38 |

Remark.
In the ORP measurement the Ag/AgCl reference electrode was used.

Figure 1:
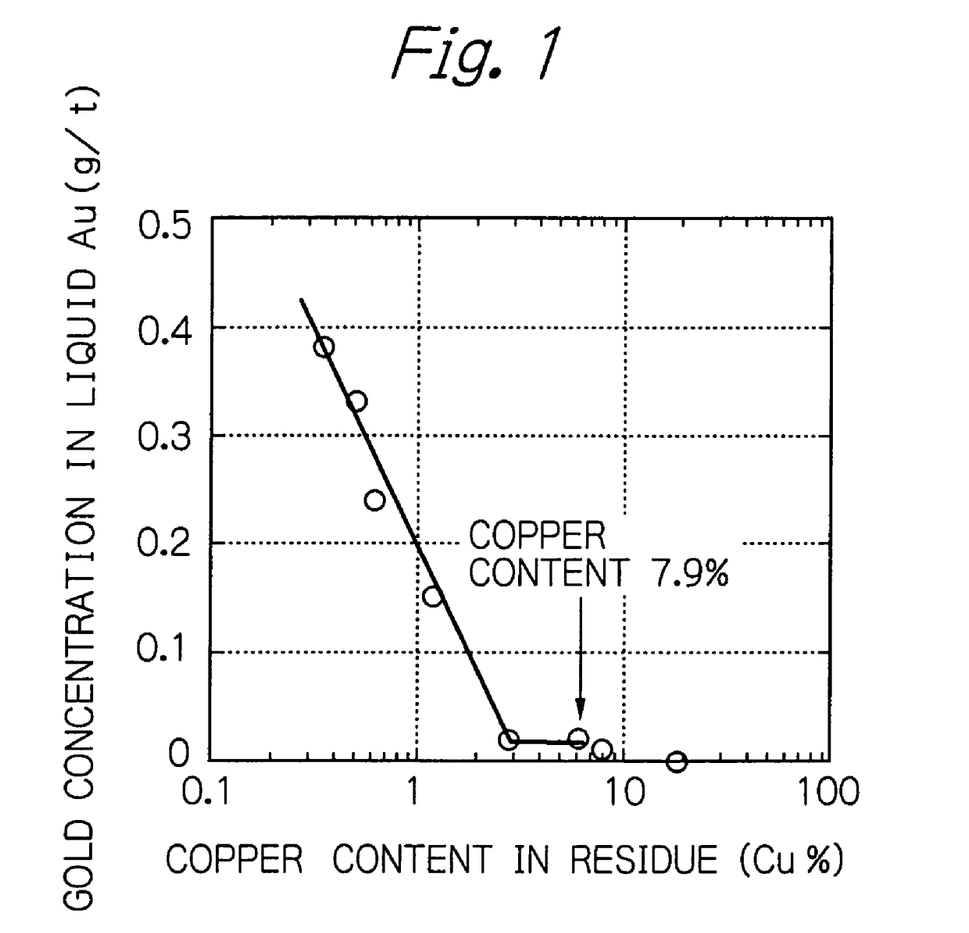
FIG. 1 is a graph showing an influence of the copper content of the leaching residue on the leaching of gold.

As is clear from these results, as the copper content in the residue decreases, the leaching of gold starts and concentration of gold leached from the concentrate into the solution increases. The leaching of gold starts when the copper content in the residue has decreased to 7.9%. When the copper content in the residue is 1.2% or less, the gold leaching occurs prominently. This tendency is shown in FIG. 1.

The gold concentration in the solution and the copper content in the residue in a range of 2.8% or less has the following relationship. The gold concentration (mg/l)=0.1900−0.3993× log [Cu content in the residue (%)]. This line crosses the X axis at 3.0% of copper content. This means that the gold leaching is appreciable, when the copper content in the residue is 3% or less. Substantial gold leaching occurs when the copper content in the residue is 7.9% or less as shown in Table 1. In addition, the gold leaching reaction proceeds where the oxidation potential is as low as approximately 533 mV. It is, therefore, unnecessary to use a conventional oxidizing reagent which has high oxidation potential exceeding 1000 mV that is approximately 780 mV with Ag/AgCl electrode.

Example 2

The liquor (third leaching liquor) which contained 31 g/l of copper as cupric chloride, 186 g/l of the total chloride ion including those of copper chloride and iron chloride, 26 g/l of sodium bromide. The raw material to be leached was 712 g of the copper concentrate, of which composition was 15% of Cu, 19% of Fe, 17% of S, and 82 g/t of Au The copper concentrate was added to 10 liter of the leach liquor, while being heated to 85° C. and being stirred. While the air was blown into the leaching liquor, the leaching was carried out. Hydrochloric acid was added to adjust pH in the range of from 0.5 to 2. The results are shown in Table 2.

TABLE 2

Measurement Results of Example 2

| Reaction | | | | Content of Residue | | Concentration in Solution | |
|---|---|---|---|---|---|---|---|
| Time (hrs) | Temperature (° C.) | ORP (mV) | pH | Cu (%) | Au (g/t) | Fe (g/l) | Au (mg/l) |
| 0 | 78 | 595 | 1.3 | 15.0 | 82 | 0 | 0 |
| 0.1 | 85 | 451 | 1.7 | 7.6 | 94 | — | 0.02 |
| 0.7 | 85 | 475 | 1.5 | 2.1 | 76 | 0.28 | 0.02 |
| 1.7 | 85 | 514 | 1.5 | 1.2 | 63 | — | 0.15 |
| 2.7 | 85 | 557 | 1.7 | 1.0 | 43 | 0.04 | 0.32 |

Remarks.
In the ORP measurement of Table 2, the Ag/AgCl reference electrode was used.

This example shows that, in the case of high copper content in feed shown as higher than 7.9%, the gold leaching starts when the copper content is reduced less than 7.9% by blowing air with existing iron shown at 0.7 hour analysis of the solution.

Example 3

The leaching liquor (the third leaching liquor) used contained 5.1 g/l of copper as cupric chloride, 5.1 g/l of iron as ferric chloride, and 126 g/l of chloride ion as sodium chloride but was free of bromide ion. The raw material to be leached was copper sulfide concentrate, which contained 22.1% of Cu, 23.4% of Fe, 29.1% of S and 73 g/t of Au. 524 g of the copper sulfide concentrate was mixed with 4 liter of the leach liquor. The leach liquor was heated to 85° C. and air was blown during the leaching. The solution was filtered every 20 hours. The filtered residue was mixed with fresh leach liquor having the same composition as mentioned above. The leaching was then continued. The measurement results are shown in Table 3.

TABLE 3

Measurement Results of Example 3

| Reaction | | | | Content of Residue | | Concentration in Solution | |
|---|---|---|---|---|---|---|---|
| Time (hrs) | Temperature (° C.) | ORP (mV) | pH | Cu (%) | Au (g/t) | Fe (g/l) | Au (mg/l) |
| 0 | 55 | 752 | 1.4 | 22.1 | 73 | 5.1 | 0 |
| 20 | 84 | 553 | 1.0 | 0.16 | 71 | 1.2 | 1.5 |
| 40 | 86 | 541 | 1.1 | 0.08 | 64 | 6.5 | 1.5 |
| 60 | 84 | 541 | 1.1 | 0.04 | 42 | 5.6 | 0.6 |
| 80 | 83 | 544 | 1.1 | — | 37 | 5.8 | 0.4 |

Remark.
In the ORP measurement of Table 3, the Ag/AgCl reference electrode was used.

As is shown in Table 3, the gold can be leached, although the leach liquor is free of the bromide ion, provided that the copper content in the residue decreases to a certain level. The dissolved gold seems to be somewhat instable so that the gold content in the residue varies.

Example 4

Copper sulfide concentrate was preliminarily leached to decrease the copper content. The resultant copper sulfide concentrate contained 0.23% of Cu, 34% of Fe, 42% of S and 20 g/t of Au. 438 g of the concentrate was mixed with the leaching liquor (third leaching liquor), which contained ferric chloride, sodium chloride and sodium bromide. The leach liquor was adjusted so that the iron concentration was 5.7 g/l, the total chloride concentration was 183 g/l, and the sodium bromide concentration was 24 g/t.

The copper sulfide concentrate was mixed with the leach liquor, which was not changed and in which air was blown during the leaching of gold. However, after 3 hour reaction, more 5 g/l of copper as cupric chloride was added.

The measurement results are shown in Table 4.

TABLE 4

Measurement Results of Example 4

| Reaction Time (hrs) | Temperature (° C.) | ORP (mV) | pH | Grade of Residue Cu (%) | Grade of Residue Au (g/t) | Concentration in Solution Fe (g/l) | Concentration in Solution Cu (g/l) | Concentration in Solution Au (mg/l) |
|---|---|---|---|---|---|---|---|---|
| 0 | 84 | 639 | 0.8 | 0.23 | 20 | 5.7 | 0 | 0 |
| 1 | 84 | 444 | 1.1 | 0.19 | 19 | 6.6 | 0.1 | 0.56 |
| 2 | 87 | 453 | 1.1 | 0.22 | 18 | 6.1 | 0.02 | 0.47 |
| 3 | 86 | 456 | 1.1 | 0.17 | 17 | 5.7 | 0.02 | 0.76 |
| 4 | 83 | 518 | 1.0 | 0.18 | 12 | 4.3 | 5.8 | 1.2 |

Remark.
In the ORP measurement of Table 4, the Ag/AgCl reference electrode was used.

In this example, during the reaction time from 0 to 3 hours, the metallic ion in the solution are essentially only iron ion, and the amount of leached gold is only 3 g/t in terms of the Au content in the residue. Copper ion was added after 3 hours passed on the reaction. Then, the amount of gold leached during 1 hour in the presence of copper ion and iron ion corresponds to a level that attained during the 3 hour reaction time mentioned above. The gold content in the residue decreases during the above one-hour reaction and the gold concentration in the solution correspondingly increases. It can, therefore, be said that the leaching rate of gold is enhanced by the added copper ion.

Example 5

The same copper sulfide concentrate as used in Example 3 was leached by 4 l of the same leach solution, which contained 4.8 g/l of copper as cupric chloride, 4.9 g/l of iron as ferric chloride and 118 g/l of the total chloride concentration by adding sodium chloride and bromine at the concentration shown in Table 5. 524 g of the sulfide concentrate was leached. During the leaching, the bromine was not added until the reaction had proceeded for 20 hours after the beginning of leaching. When the copper content lowered to a level that does not effect the gold leaching, 22 to 25 g/l of sodium bromide was then added in the solution. Filtering the solution was carried out every twenty hours, and the leaching residue was further leached with the fresh leach liquor as in Example 3. The results are shown in Table 5.

TABLE 5

Measurement Results of Example 5

| Reaction Time (hrs) | Temperature (° C.) | ORP (mV) | pH | Content of Residue Cu (%) | Content of Residue Au (g/t) | Concentration in Solution Fe (g/l) | Concentration in Solution Br (g/l) | Concentration in Solution Au (mg/l) |
|---|---|---|---|---|---|---|---|---|
| 0 | 84 | 737 | 1.2 | 22.1 | 73 | 4.9 | 0 | 0 |
| 20 | 86 | 518 | 1.1 | 0.18 | 66 | 5.5 | 0 | 1.0 |
| 40 | 86 | 476 | 1.0 | — | 52 | 7.1 | 22 | 0.7 |
| 60 | 84 | 482 | 0.9 | — | 37 | 7.2 | 22 | 2.5 |
| 80 | 86 | 479 | 1.0 | — | 21 | 6.1 | 25 | 0.5 |

Remark.
In the ORP measurement of Table 4, the Ag/AgCl reference electrode was used.

Figure 2:
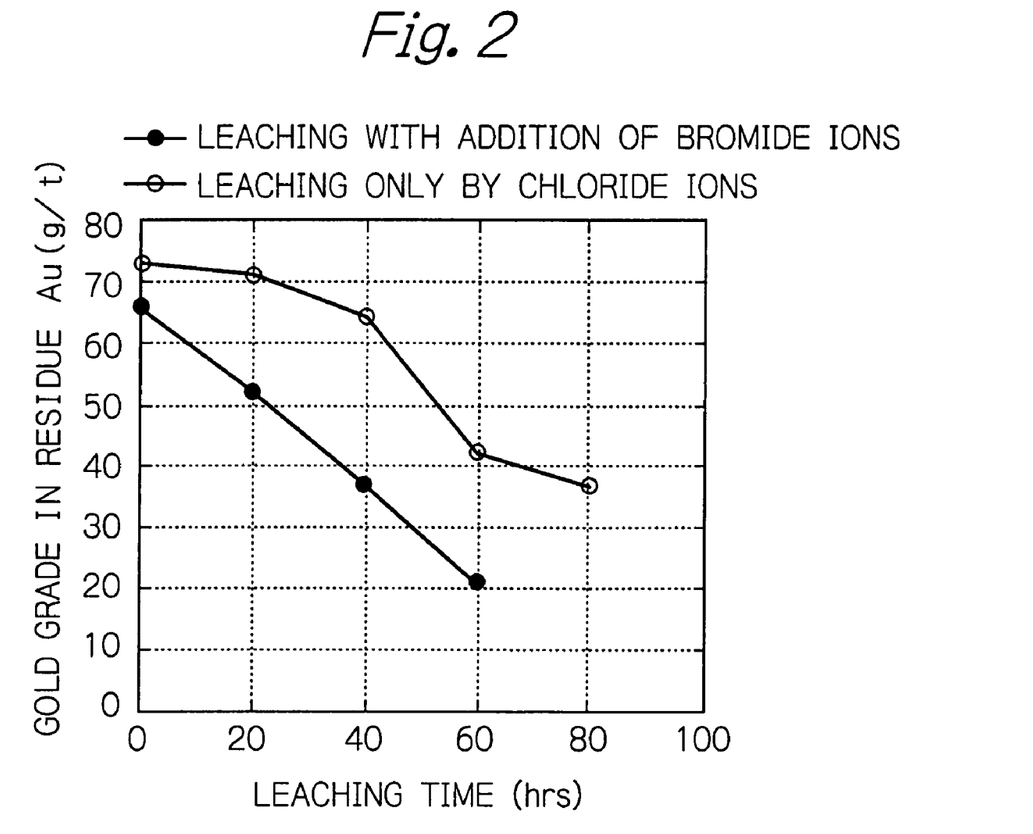
FIG. 2 is a graph showing an influence of the bromide ion on the leaching of gold.

In Example 3, in which bromide ion was not added to the leach liquor, the gold content of the residue decreased to 37 g/t after 80 hour leaching. Contrary to this, in Example 5, in which bromide ion was added, the gold content of the residue decreased to 21 g/t after leaching for 80 hours. In Example 5, the reaction time with the presence of bromide ion is for 60 hours, and the gold content in residue decreased by 45 g/l. The gold leaching in Example 3 (without the addition of bromide ion) and Example 5 (with the addition of bromide ion) are illustrated in FIG. 2.

The leaching rate of gold under the presence of bromide ion is 0.75 g/t/hr, while the rate without the bromide ion is 0.46 g/t/hr. The former speed is approximately 1.6 times as fast as the latter. In addition, the gold content in the residue decreases linearly, which indicates that bromide ion enhances the stability of gold complex.

Example 6

Copper sulfide concentrate was leached to decrease the copper content to such a level that it does not influence upon the leaching of gold. The resultant leaching residue contained 12% of Cu, 26% of Fe, 31% of S, and 50 g/t of Au. The resultant leaching residue was further leached by the leach liquor (the third leaching liquor), in which the cupric chloride, sodium chloride and the sodium bromide was dissolved (28.8 g/l of Cu, 166 g/l of Cl and 20.6 g/l of Br). The iron concentration in the leach liquor was varied by changing pH with adding sodium hydroxide solution or hydrochloric acid, so as to examine influence of the iron concentration upon the leaching of gold. During leaching for 15 hours with blowing air, the leaching liquor was stirred and the temperature was maintained at 85° C. The results are shown in Table 6.

TABLE 6

Measurement Results of Example 6

| pH | Concentration in Leaching Liquor (Fe g/l) | Content of Residue (Ag, g/t) |
|---|---|---|
| 0.9 | 3.0 | 14 |
| 1.0 | 1.8 | 14 |
| 1.1 | 1.3 | 13 |
| 1.4 | 0.49 | 14 |
| 1.6 | 0.18 | 18 |
| 1.7 | 0.22 | 16 |
| 1.7 | 0.09 | 21 |
| 2.0 | 0.01 | 43 |

Figure 3:
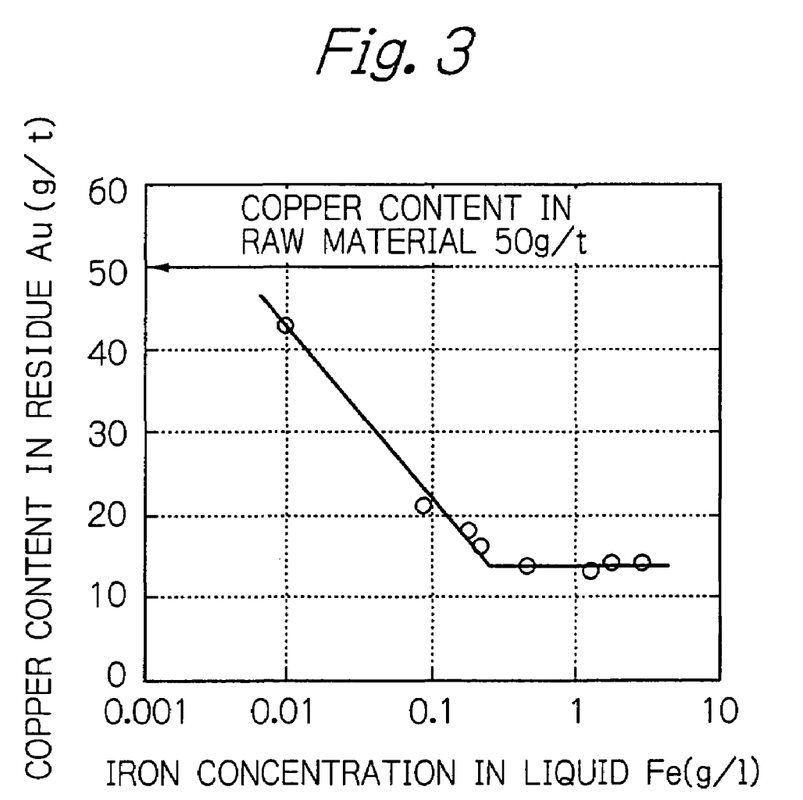
FIG. 3 is a graph showing an influence of iron ion on the leaching of gold.

The result shown in Table 6 is graphically illustrated in FIG. 3, in which the iron concentration of the leach liquor is shown in logarithm scale, while the gold content is shown in the ordinate. FIG. 3 indicates that the gold can be leached when the iron concentration is 0.01 g/l or more. Also, the degree of gold leaching per unit time is dependent upon the iron concentration up to a certain value, in such a manner that the gold content decreases with the increase of the iron concentration. These facts indicate that the iron concentration exerts an influence upon the leaching rate of gold as follows. The leaching rate increases with the increase in the iron concentration but is not influenced by the iron concentration higher than a certain level. These two trends are expressed as the two straight lines intersecting at 0.26 g/l of the iron concentration.

Consequently, the gold can be leached if the iron concentration is 0.01 g/l or more. The leaching time can be shortened with increase of the iron concentration up to 0.26 g/l. The leaching is possible but the leaching time is not shortened with the increase in the iron concentration over 0.26 g/l.

Figure 4:
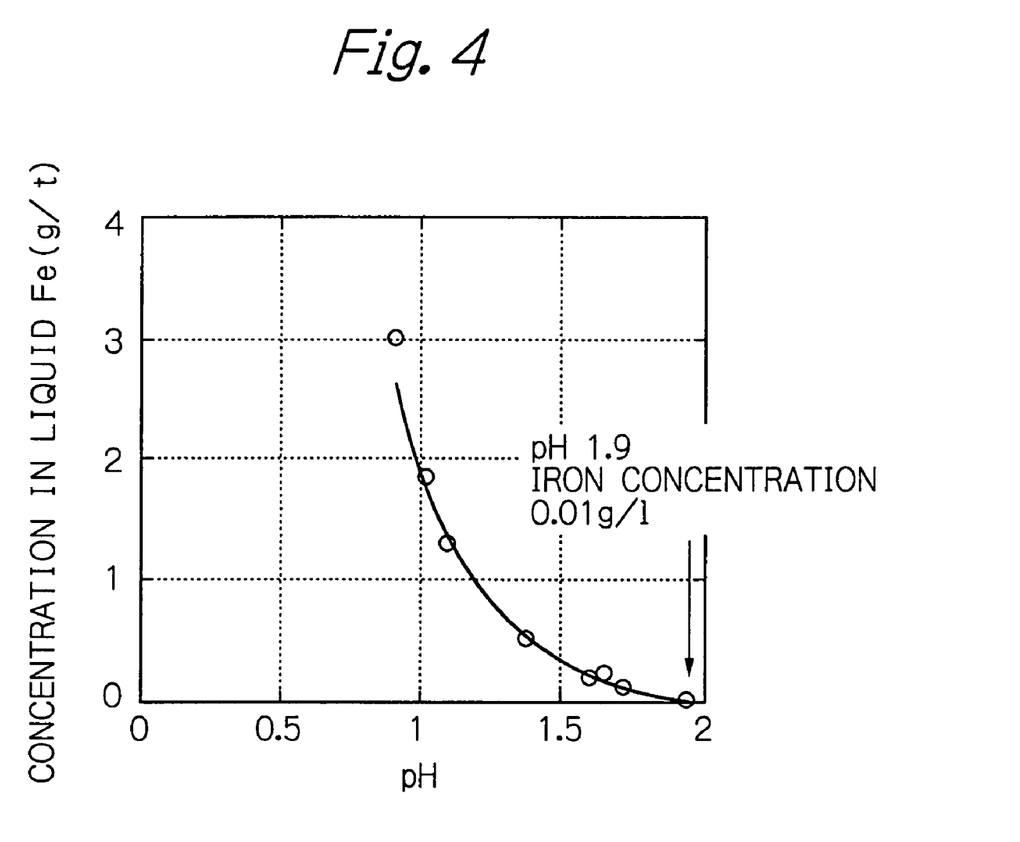
FIG. 4 is a graph showing an influence of pH on the iron concentration.

The iron in the solution is present in the form of ferric ion, when air is blown into the leach liquor during the leaching reaction. The solubility of the ferric ion is dependent upon pH. The influence of pH on the iron concentration in Example 6 is graphically illustrated in FIG. 4. As shown in FIG. 4, the iron concentration in the solution decreases with the increase in pH. The pH must be 1.9 or less in order to ensure the iron concentration on the necessary level for the leaching of gold.

The invention claimed is:

1. A method for leaching gold from a copper sulfide ore containing gold comprising:
    leaching copper down to 7.9% or less of copper content to form a leach residue containing the gold,
    bringing the leach residue of said copper sulfide ore containing gold into contact with a leaching solution that dissolves ferrous ion, ferric ion and chloride ion, thereby leaching the gold with oxidizing potential of the ferric ion at a pH of 0.5 to 1.9 to maintain ferric ion in solution; and
    blowing air into the leaching solution having a pH of 0.5 to 1.9 thereby oxidizing said ferrous ion to form ferric ion, without blowing chlorine gas.

2. A method according to claim 1, wherein said leach residue is added into the leaching solution which contains ferrous ion, ferric ion and chloride ion.

3. A method according to claim 1, wherein copper ions are co-present in the leaching solution of gold so as to increase the leaching speed of gold.

4. A method according to claim 1, wherein bromide ion is co-present in the leaching solution of gold, so as to increase the leaching speed of gold.

5. A method according to claim 1, wherein the concentration of ferric ion in the leaching solution of gold is 0.01 g/l or more.

6. The method according to claim 1, wherein the leaching solution that dissolves chloride ion and ferric ion is prepared with at least one selected from the group consisting of ferric chloride, cupric chloride and sodium chloride.

7. The method according to claim 1, wherein the leaching solution that dissolves chloride ion and ferric ion is prepared with ferric chloride.

8. The method according to claim 1, wherein the leaching solution that contacts the leach residue is prepared with at least one selected from the group consisting essentially of ferric chloride, cupric chloride and sodium chloride.

9. A method for leaching gold from a copper sulfide ore containing gold and/or a silicate ore containing gold, comprising:
    leaching copper down to less than 7.9% of copper content in a leaching solution that comprises chloride ion, ferrous ion and ferric ion;
    blowing air into the leaching solution to oxidize said ferrous ion to ferric ion at a pH of 0.5 to 1.9 and oxidizing gold with the oxidation potential of ferric ion, without blowing chlorine gas.

10. The method according to claim 9, wherein the leaching solution that dissolves chloride ion and ferric ion is prepared with at least one selected from the group consisting of ferric chloride, cupric chloride and sodium chloride.

11. The method according to claim 9, wherein the leaching solution that dissolves chloride ion and ferric ion is prepared with ferric chloride.

12. The method according to claim 9, wherein the leaching solution that dissolves chloride ion and ferric ion is prepared with at least one selected from the group consisting essentially of ferric chloride, cupric chloride and sodium chloride.

13. The method according to claim 9, wherein the leaching solution that dissolves chloride ion and ferric ion has copper ions co-present in the leaching solution of gold so as to increase the leaching speed of gold.

14. The method according to claim 9, wherein the leaching solution that dissolves chloride ion and ferric ion has bromide ions co-present in the leaching solution of gold, so as to increase the leaching speed of gold.

15. The method according to claim 9, wherein the leaching solution that dissolves chloride ion and ferric ion has a concentration of ferric ion of 0.01 g/L or more.

* * * * *